United States Patent
Cai et al.

(10) Patent No.: US 10,345,594 B2
(45) Date of Patent: Jul. 9, 2019

(54) SYSTEMS AND METHODS FOR AUGMENTED NEAR-EYE WEARABLE DISPLAYS

(71) Applicant: Ostendo Technologies, Inc., Carlsbad, CA (US)

(72) Inventors: Jingbo Cai, Carlsbad, CA (US); Hussein S. El-Ghoroury, Carlsbad, CA (US); Reginald Jonker, Murrieta, CA (US); Marty Maiers, Fallbrook, CA (US); Chih-Li Chuang, San Diego, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 15/381,459

(22) Filed: Dec. 16, 2016

(65) Prior Publication Data

US 2017/0176755 A1 Jun. 22, 2017

Related U.S. Application Data

(60) Provisional application No. 62/269,510, filed on Dec. 18, 2015.

(51) Int. Cl.
*G02B 5/18* (2006.01)
*G06T 19/00* (2011.01)
(Continued)

(52) U.S. Cl.
CPC ....... *G02B 27/0172* (2013.01); *G02B 5/1842* (2013.01); *G02B 27/0093* (2013.01);
(Continued)

(58) Field of Classification Search
None
See application file for complete search history.

(56) References Cited

U.S. PATENT DOCUMENTS

| | | | |
|---|---|---|---|
| 4,427,912 | A | 1/1984 | Bui et al. |
| 5,162,828 | A | 11/1992 | Furness et al. |

(Continued)

FOREIGN PATENT DOCUMENTS

| | | |
|---|---|---|
| CN | 103298410 | 9/2013 |
| CN | 103546181 | 1/2014 |

(Continued)

OTHER PUBLICATIONS

"International Search Report and Written Opinion of the International Searching Authority dated Mar. 14, 2017; International Application No. PCT/US2016/067623", Mar. 14, 2017.

(Continued)

*Primary Examiner* — Gustavo Polo
(74) *Attorney, Agent, or Firm* — Womble Bond Dickinson (US) LLP (57) ABSTRACT

Wearable augmented reality display systems are provided. One or a plurality of emissive display elements are embedded in the bridge area of an eyeglass frame. The lenses are provided with a set of transmissive diffractive optical elements and partially reflective diffractive optical elements. The display outputs are directed toward the lens elements whereby the diffractive elements in turn direct the outputs toward the eye-boxes of the viewer.

20 Claims, 6 Drawing Sheets

(51) Int. Cl.
 *G02B 27/01* (2006.01)
 *G02B 27/42* (2006.01)
 *G02B 27/00* (2006.01)

(52) U.S. Cl.
 CPC ..... *G02B 27/0179* (2013.01); *G02B 27/4205* (2013.01); *G02B 2027/0123* (2013.01); *G02B 2027/0138* (2013.01); *G02B 2027/0174* (2013.01); *G02B 2027/0178* (2013.01); *G02B 2027/0187* (2013.01); *G06T 19/006* (2013.01)

(56) References Cited

U.S. PATENT DOCUMENTS

| | | | |
|---|---|---|---|
| 5,368,042 A | 11/1994 | O'Neal et al. | |
| 5,619,373 A | 4/1997 | Meyerhofer et al. | |
| 5,696,521 A | 12/1997 | Robinson et al. | |
| 5,818,359 A | 10/1998 | Beach | |
| 5,886,822 A | 3/1999 | Spitzer | |
| 5,986,811 A | 11/1999 | Wohlstadter | |
| 6,128,003 A | 10/2000 | Smith et al. | |
| 6,147,807 A | 11/2000 | Droessler et al. | |
| 6,151,167 A | 11/2000 | Melville | |
| 6,353,503 B1 | 3/2002 | Spitzer et al. | |
| 6,433,907 B1 | 8/2002 | Lippert et al. | |
| 6,456,438 B1 | 9/2002 | Lee et al. | |
| 6,522,794 B1 | 2/2003 | Bischel et al. | |
| 6,529,331 B2 | 3/2003 | Massof et al. | |
| 6,666,825 B2 | 12/2003 | Smith et al. | |
| 6,710,902 B2 | 3/2004 | Takeyama | |
| 6,719,693 B2 | 4/2004 | Richard | |
| 6,795,221 B1 | 9/2004 | Urey | |
| 6,803,561 B2 | 10/2004 | Dunfield | |
| 6,804,066 B1 | 10/2004 | Ha et al. | |
| 6,829,095 B2 | 12/2004 | Amitai | |
| 6,924,476 B2 | 8/2005 | Wine et al. | |
| 6,937,221 B2 | 8/2005 | Lippert et al. | |
| 6,984,208 B2 | 1/2006 | Zheng | |
| 6,999,238 B2 | 2/2006 | Glebov et al. | |
| 7,061,450 B2 | 6/2006 | Bright et al. | |
| 7,071,594 B1 | 7/2006 | Yan et al. | |
| 7,106,519 B2 | 9/2006 | Aizenberg et al. | |
| 7,190,329 B2 | 3/2007 | Lewis et al. | |
| 7,193,758 B2 | 3/2007 | Wiklof et al. | |
| 7,209,271 B2 | 4/2007 | Lewis et al. | |
| 7,215,475 B2 | 5/2007 | Woodgate et al. | |
| 7,232,071 B2 | 6/2007 | Lewis et al. | |
| 7,369,321 B1 | 5/2008 | Ren et al. | |
| 7,482,730 B2 | 1/2009 | Davis et al. | |
| 7,486,255 B2 | 2/2009 | Brown et al. | |
| 7,545,571 B2 | 6/2009 | Garoutte et al. | |
| 7,580,007 B2 | 8/2009 | Brown et al. | |
| 7,619,807 B2 | 11/2009 | Baek et al. | |
| 7,623,560 B2 | 11/2009 | El-Ghoroury et al. | |
| 7,724,210 B2 | 5/2010 | Sprague et al. | |
| 7,747,301 B2 | 6/2010 | Cheng et al. | |
| 7,767,479 B2 | 8/2010 | El-Ghoroury et al. | |
| 7,791,810 B2 | 9/2010 | Powell | |
| 7,829,902 B2 | 11/2010 | El-Ghoroury et al. | |
| 7,952,809 B2 | 5/2011 | Takai | |
| 8,049,231 B2 | 11/2011 | El-Ghoroury et al. | |
| 8,098,265 B2 | 1/2012 | El-Ghoroury et al. | |
| 8,243,770 B2 | 8/2012 | El-Ghoroury et al. | |
| 8,279,716 B1 | 10/2012 | Gossweiler, III et al. | |
| 8,292,833 B2 | 10/2012 | Son et al. | |
| 8,405,618 B2 | 3/2013 | Colgate et al. | |
| 8,471,967 B2 | 6/2013 | Miao et al. | |
| 8,477,425 B2 | 7/2013 | Border et al. | |
| 8,482,859 B2 | 7/2013 | Border | |
| 8,508,830 B1 | 8/2013 | Wang | |
| 8,508,851 B2 | 8/2013 | Miao et al. | |
| 8,510,244 B2 | 8/2013 | Carson et al. | |
| 8,553,910 B1 | 10/2013 | Dong et al. | |
| 8,567,960 B2 | 10/2013 | El-Ghoroury et al. | |
| 8,619,049 B2 | 12/2013 | Harrison et al. | |
| 8,725,842 B1 | 5/2014 | Al-Nasser | |
| 8,743,145 B1 | 6/2014 | Price | |
| 8,773,599 B2 | 7/2014 | Saeedi et al. | |
| 8,854,724 B2 | 10/2014 | El-Ghoroury et al. | |
| 8,928,969 B2 | 1/2015 | Alpaslan et al. | |
| 8,975,713 B2 | 3/2015 | Sako et al. | |
| 9,097,890 B2 | 8/2015 | Miller et al. | |
| 9,110,504 B2 | 8/2015 | Lewis et al. | |
| 9,134,535 B2 | 9/2015 | Dobschal et al. | |
| 9,179,126 B2 | 11/2015 | El-Ghoroury et al. | |
| 9,195,053 B2 | 11/2015 | El-Ghoroury et al. | |
| 9,239,453 B2 | 1/2016 | Cheng et al. | |
| 9,244,277 B2 | 1/2016 | Cheng et al. | |
| 9,244,539 B2 | 1/2016 | Venable et al. | |
| 9,274,608 B2 | 3/2016 | Katz et al. | |
| 9,286,730 B2 | 3/2016 | Bar-Zeev et al. | |
| 9,529,191 B2 | 12/2016 | Sverdrup et al. | |
| 9,538,182 B2 | 1/2017 | Mishourovsky et al. | |
| 9,681,069 B2 | 6/2017 | El-Ghoroury et al. | |
| 9,712,764 B2 | 7/2017 | El-Ghoroury et al. | |
| 9,774,800 B2 | 9/2017 | El-Ghoroury et al. | |
| 9,779,515 B2 | 10/2017 | El-Ghoroury et al. | |
| 9,965,982 B2 | 5/2018 | Lapstun | |
| 2002/0008854 A1 | 1/2002 | Leigh Travis | |
| 2002/0017567 A1 | 2/2002 | Connolly et al. | |
| 2002/0024495 A1 | 2/2002 | Lippert et al. | |
| 2002/0075232 A1 | 6/2002 | Daum et al. | |
| 2002/0083164 A1 | 6/2002 | Katayama et al. | |
| 2002/0141026 A1 | 10/2002 | Wiklof et al. | |
| 2002/0158814 A1 | 10/2002 | Bright et al. | |
| 2002/0181115 A1 | 12/2002 | Massof et al. | |
| 2002/0194005 A1 | 12/2002 | Lahr | |
| 2003/0032884 A1 | 2/2003 | Smith et al. | |
| 2003/0086135 A1 | 5/2003 | Takeyama | |
| 2003/0122066 A1 | 7/2003 | Dunfield | |
| 2003/0138130 A1 | 7/2003 | Cohen et al. | |
| 2003/0184575 A1 | 10/2003 | Reho | |
| 2003/0187357 A1 | 10/2003 | Richard | |
| 2004/0004585 A1 | 1/2004 | Brown et al. | |
| 2004/0024312 A1 | 2/2004 | Zheng | |
| 2004/0051392 A1 | 3/2004 | Badarneh | |
| 2004/0080807 A1 | 4/2004 | Chen et al. | |
| 2004/0080938 A1 | 4/2004 | Holman et al. | |
| 2004/0085261 A1 | 5/2004 | Lewis et al. | |
| 2004/0119004 A1 | 6/2004 | Wine et al. | |
| 2004/0125076 A1 | 7/2004 | Green | |
| 2004/0138935 A1 | 7/2004 | Johnson et al. | |
| 2004/0179254 A1 | 9/2004 | Lewis et al. | |
| 2004/0240064 A1 | 12/2004 | Dutta | |
| 2005/0002074 A1 | 1/2005 | McPheters et al. | |
| 2005/0024730 A1 | 2/2005 | Aizenberg et al. | |
| 2005/0053192 A1 | 3/2005 | Sukovic et al. | |
| 2005/0116038 A1 | 6/2005 | Lewis et al. | |
| 2005/0117195 A1 | 6/2005 | Glebov et al. | |
| 2005/0168700 A1 | 8/2005 | Berg et al. | |
| 2005/0179976 A1 | 8/2005 | Davis et al. | |
| 2005/0264502 A1 | 12/2005 | Sprague et al. | |
| 2006/0017655 A1 | 1/2006 | Brown et al. | |
| 2006/0132383 A1 | 6/2006 | Gally et al. | |
| 2006/0152812 A1 | 7/2006 | Woodgate et al. | |
| 2006/0253007 A1 | 11/2006 | Cheng et al. | |
| 2006/0285192 A1 | 12/2006 | Yang | |
| 2006/0290663 A1 | 12/2006 | Mitchell | |
| 2007/0052694 A1 | 3/2007 | Holmes | |
| 2007/0083120 A1 | 4/2007 | Cain et al. | |
| 2007/0236450 A1 | 10/2007 | Colgate et al. | |
| 2007/0269432 A1 | 11/2007 | Nakamura et al. | |
| 2007/0276658 A1 | 11/2007 | Douglass | |
| 2008/0002262 A1 | 1/2008 | Chirieleison | |
| 2008/0049291 A1 | 2/2008 | Baek et al. | |
| 2008/0130069 A1 | 6/2008 | Cernasov | |
| 2008/0141316 A1 | 6/2008 | Igoe et al. | |
| 2008/0239452 A1 | 10/2008 | Xu et al. | |
| 2009/0073559 A1 | 3/2009 | Woodgate et al. | |
| 2009/0086170 A1 | 4/2009 | El-Ghoroury et al. | |
| 2009/0096746 A1 | 4/2009 | Kruse et al. | |
| 2009/0161191 A1 | 6/2009 | Powell | |
| 2009/0199900 A1 | 8/2009 | Bita et al. | |
| 2009/0222113 A1 | 9/2009 | Fuller et al. | |

(56) References Cited

U.S. PATENT DOCUMENTS

| | | |
|---|---|---|
| 2009/0256287 A1* | 10/2009 | Fu .................... B82Y 10/00 264/447 |
| 2009/0268303 A1 | 10/2009 | Takai |
| 2009/0278998 A1 | 11/2009 | El-Ghoroury et al. |
| 2009/0327171 A1 | 12/2009 | Tan et al. |
| 2010/0003777 A1 | 1/2010 | El-Ghoroury et al. |
| 2010/0026960 A1 | 2/2010 | Sprague |
| 2010/0046070 A1 | 2/2010 | Mukawa |
| 2010/0053164 A1 | 3/2010 | Imai et al. |
| 2010/0066921 A1 | 3/2010 | El-Ghoroury et al. |
| 2010/0091050 A1 | 4/2010 | El-Ghoroury et al. |
| 2010/0156676 A1 | 6/2010 | Mooring et al. |
| 2010/0171922 A1 | 7/2010 | Sessner et al. |
| 2010/0199232 A1 | 8/2010 | Mistry et al. |
| 2010/0220042 A1 | 9/2010 | El-Ghoroury et al. |
| 2010/0241601 A1 | 9/2010 | Carson et al. |
| 2010/0245957 A1 | 9/2010 | Hudman et al. |
| 2010/0259472 A1 | 10/2010 | Radivojevic et al. |
| 2010/0267449 A1 | 10/2010 | Gagner et al. |
| 2011/0054360 A1 | 3/2011 | Son et al. |
| 2011/0115887 A1 | 5/2011 | Yoo et al. |
| 2011/0221659 A1 | 9/2011 | King, III et al. |
| 2011/0285666 A1 | 11/2011 | Poupyrev et al. |
| 2011/0285667 A1 | 11/2011 | Poupyrev et al. |
| 2012/0033113 A1 | 2/2012 | El-Ghoroury et al. |
| 2012/0075173 A1 | 3/2012 | Ashbrook et al. |
| 2012/0075196 A1 | 3/2012 | Ashbrook et al. |
| 2012/0105310 A1 | 5/2012 | Sverdrup et al. |
| 2012/0113097 A1 | 5/2012 | Nam et al. |
| 2012/0120498 A1 | 5/2012 | Harrison et al. |
| 2012/0143358 A1 | 6/2012 | Adams et al. |
| 2012/0154441 A1 | 6/2012 | Kim |
| 2012/0157203 A1 | 6/2012 | Latta et al. |
| 2012/0195461 A1 | 8/2012 | Lawrence Ashok Inigo |
| 2012/0212398 A1 | 8/2012 | Border et al. |
| 2012/0212399 A1 | 8/2012 | Border et al. |
| 2012/0218301 A1 | 8/2012 | Miller |
| 2012/0236201 A1 | 9/2012 | Larsen et al. |
| 2012/0249409 A1 | 10/2012 | Toney et al. |
| 2012/0249741 A1 | 10/2012 | Maciocci et al. |
| 2012/0288995 A1 | 11/2012 | El-Ghoroury et al. |
| 2012/0290943 A1 | 11/2012 | Toney et al. |
| 2012/0293402 A1 | 11/2012 | Harrison et al. |
| 2012/0299962 A1 | 11/2012 | White et al. |
| 2012/0319940 A1 | 12/2012 | Bress et al. |
| 2012/0320092 A1 | 12/2012 | Shin et al. |
| 2013/0016292 A1 | 1/2013 | Miao et al. |
| 2013/0021658 A1 | 1/2013 | Miao et al. |
| 2013/0027341 A1 | 1/2013 | Mastandrea |
| 2013/0041477 A1 | 2/2013 | Sikdar et al. |
| 2013/0050260 A1 | 2/2013 | Reitan |
| 2013/0080890 A1 | 3/2013 | Krishnamurthi |
| 2013/0083303 A1 | 4/2013 | Hoover et al. |
| 2013/0100362 A1 | 4/2013 | Saeedi et al. |
| 2013/0141895 A1 | 6/2013 | Alpaslan et al. |
| 2013/0162505 A1 | 6/2013 | Crocco et al. |
| 2013/0169536 A1 | 7/2013 | Wexler et al. |
| 2013/0176622 A1 | 7/2013 | Abrahamsson et al. |
| 2013/0187836 A1 | 7/2013 | Cheng et al. |
| 2013/0196757 A1 | 8/2013 | Latta et al. |
| 2013/0215516 A1 | 8/2013 | Dobschal et al. |
| 2013/0225999 A1 | 8/2013 | Banjanin et al. |
| 2013/0258451 A1 | 10/2013 | El-Ghoroury et al. |
| 2013/0271679 A1 | 10/2013 | Sakamoto et al. |
| 2013/0285174 A1 | 10/2013 | Sako et al. |
| 2013/0286053 A1 | 10/2013 | Fleck et al. |
| 2013/0286178 A1 | 10/2013 | Lewis et al. |
| 2013/0321581 A1 | 12/2013 | El-Ghoroury et al. |
| 2014/0009845 A1 | 1/2014 | Cheng et al. |
| 2014/0024132 A1 | 1/2014 | Jia et al. |
| 2014/0049417 A1 | 2/2014 | Abdurrahman et al. |
| 2014/0049983 A1 | 2/2014 | Nichol et al. |
| 2014/0055352 A1 | 2/2014 | David et al. |
| 2014/0055692 A1 | 2/2014 | Kroll et al. |
| 2014/0085177 A1 | 3/2014 | Lyons et al. |
| 2014/0091984 A1 | 4/2014 | Ashbrook et al. |
| 2014/0098018 A1 | 4/2014 | Kim et al. |
| 2014/0098067 A1 | 4/2014 | Yang et al. |
| 2014/0118252 A1 | 5/2014 | Kim et al. |
| 2014/0129207 A1 | 5/2014 | Bailey et al. |
| 2014/0139454 A1 | 5/2014 | Mistry et al. |
| 2014/0139576 A1 | 5/2014 | Costa et al. |
| 2014/0147035 A1 | 5/2014 | Ding et al. |
| 2014/0168062 A1 | 6/2014 | Katz et al. |
| 2014/0176417 A1 | 6/2014 | Young et al. |
| 2014/0185142 A1* | 7/2014 | Gupta ................ G02B 27/1086 359/630 |
| 2014/0200496 A1 | 7/2014 | Hyde et al. |
| 2014/0232651 A1 | 8/2014 | Kress et al. |
| 2014/0292620 A1 | 10/2014 | Lapstun |
| 2014/0300869 A1 | 10/2014 | Hirsch et al. |
| 2014/0301662 A1 | 10/2014 | Justice et al. |
| 2014/0304646 A1 | 10/2014 | Rossmann |
| 2014/0340304 A1 | 11/2014 | Dewan et al. |
| 2015/0001987 A1 | 1/2015 | Masaki et al. |
| 2015/0033539 A1 | 2/2015 | El-Ghoroury et al. |
| 2015/0035832 A1 | 2/2015 | Sugden et al. |
| 2015/0054729 A1 | 2/2015 | Minnen et al. |
| 2015/0058102 A1 | 2/2015 | Christensen et al. |
| 2015/0125109 A1 | 5/2015 | Robbins et al. |
| 2015/0138086 A1 | 5/2015 | Underkoffler et al. |
| 2015/0148886 A1 | 5/2015 | Rao et al. |
| 2015/0193984 A1 | 7/2015 | Bar-Zeev et al. |
| 2015/0205126 A1 | 7/2015 | Schowengerdt |
| 2015/0220109 A1 | 8/2015 | von Badinski et al. |
| 2015/0235467 A1 | 8/2015 | Schowengerdt et al. |
| 2015/0277126 A1 | 10/2015 | Hirano et al. |
| 2015/0301256 A1 | 10/2015 | Takiguchi |
| 2015/0301383 A1 | 10/2015 | Kimura |
| 2015/0323990 A1 | 11/2015 | Maltz |
| 2015/0323998 A1 | 11/2015 | Kudekar et al. |
| 2015/0326842 A1 | 11/2015 | Huai |
| 2015/0381782 A1 | 12/2015 | Park |
| 2016/0018948 A1 | 1/2016 | Parvarandeh et al. |
| 2016/0026059 A1 | 1/2016 | Chung et al. |
| 2016/0028935 A1 | 1/2016 | El-Ghoroury et al. |
| 2016/0116738 A1 | 4/2016 | Osterhout |
| 2016/0182782 A1 | 6/2016 | El-Ghoroury et al. |
| 2016/0191765 A1 | 6/2016 | El-Ghoroury et al. |
| 2016/0191823 A1 | 6/2016 | El-Ghoroury et al. |
| 2016/0220232 A1 | 8/2016 | Takada et al. |
| 2016/0342151 A1 | 11/2016 | Dey, IV et al. |
| 2017/0065872 A1 | 3/2017 | Kelley |
| 2017/0069134 A1 | 3/2017 | Shapira et al. |
| 2017/0184776 A1 | 6/2017 | El-Ghoroury et al. |
| 2017/0236295 A1 | 8/2017 | El-Ghoroury |
| 2017/0261388 A1 | 9/2017 | Ma et al. |
| 2017/0310956 A1 | 10/2017 | Perdices-Gonzalez et al. |

FOREIGN PATENT DOCUMENTS

| | | |
|---|---|---|
| CN | 103558918 | 2/2014 |
| CN | 104460992 | 3/2015 |
| EP | 0431488 | 1/1996 |
| WO | WO-2014/124173 | 8/2014 |

OTHER PUBLICATIONS

Ahumada, Jr., Albert J. et al., "Spatio-temporal discrimination model predicts temporal masking functions", Proceedings of SPIE—the International Society for Optical Engineering, Human vision and electronic imaging III, vol. 3299, 1998, 6 pp. total.

Beulen, Bart W. et al., "Toward Noninvasive Blood Pressure Assessment in Arteries by Using Ultrasound", Ultrasound in Medicine & Biology, vol. 37, No. 5, 2011, pp. 788-797.

Bickel, Bernd et al., "Capture and Modeling of Non-Linear Heterogeneous Soft Tissue", ACM Transactions on Graphics (TOG)—Proceedings of ACM SIGGRAH 2009, vol. 28, Issue 3, Article No. 89, Aug. 2009, 9 pp. total.

Castellini, Claudio et al., "Using Ultrasound Images of the Forearm to Predict Finger Positions", IEEE Transactions on Neural Systems (56) References Cited

OTHER PUBLICATIONS and Rehabilitation Engineering, vol. 20, No. 6, Nov. 2012, pp. 788-797.
Cobbold, Richard S., "Foundations of Biomedical Ultrasound", Oxford University Press, 2007, pp. 3-95.
Fattal, David et al., "A multi-directional backlight for a wide-angle, glasses-free three-dimensional display", Nature, vol. 495, Mar. 21, 2013, pp. 348-351.
Grossberg, Stephen et al., "Neural dynamics of saccadic and smooth pursuit eye movement coordination during visual tracking of unpredictably moving targets", Neural Networks, vol. 27, 2012, pp. 1-20.
Guo, Jing-Yi et al., "Dynamic monitoring of forearm muscles using one-dimensional sonomyography system", Journal of Rehabilitation Research & Development, vol. 45, No. 1, 2008, pp. 187-195.
Harrison, Chris et al., "Skinput: Appropriating the Body as an Input Surface", CHI '10 Proceedings of the SIGCHI Conference on Human Factors in Computing Systems, 2010, pp. 453-462.
Hsiao, Tzu-Yu et al., "Noninvasive Assessment of Laryngeal Phonation Function Using Color Doppler Ultrasound Imaging", Ultrasound in Med. & Biol., vol. 27, No. 8, 2001, pp. 1035-1040.
Hua, Hong et al., "A 3D integral imaging optical see-through head-mounted display", Optics Express, vol. 22, No. 11, May 28, 2014, pp. 13484-13491.
Keir, Peter J. et al., "Changes in geometry of the finger flexor tendons in the carpal tunnel with wrist posture and tendon load: an MRI study on normal wrists", Clinical Biomechanics, vol. 14, 1999, pp. 635-645.
Khuri-Yakub, Butrus T. et al., "Capacitive micromachined ultrasonic transducers for medical imaging and therapy", J. Micromech. Microeng., vol. 21, No. 5, May 2011, pp. 054004-054014.
Koutsouridis, G. G. et al., "Towards a Non-Invasive Ultrasound Pressure Assessment in Large Arteries", Technische Universiteit Eindhoven, University of Technology, Mate Poster Award 2010 : 15th Annual Poster Contest, 2010, 1 page total.
Lanman, Douglas et al., "Near-Eye Light Field Displays", ACM Transactions on Graphics (TOC), vol. 32, Issue 6, Article 220, Nov. 2013, 27 pp. total.
Legros, M. et al., "Piezocomposite and CMUT Arrays Assessment Through In Vitro Imaging Performances", 2008 IEEE Ultrasonics Symposium, Nov. 2-5, 2008, pp. 1142-1145.
Martin, Joel R. et al., "Changes in the flexor digitorum profundus tendon geometry in the carpal tunnel due to force production and posture of metacarpophalangeal joint of the index finger: An MRI study", Clinical Biomechanics, vol. 28, 2013, pp. 157-163.
Martin, Joel R. et al., "Effects of the index finger position and force production on the flexor digitorum superficialis moment arms at the metacarpophalangeal joints—a magnetic resonance imaging study", Clinical Biomechanics, vol. 27, 2012, pp. 453-459.
Marwah, Kshitij et al., "Compressive Light Field Photography using Overcomplete Dictionaries and Optimized Projections", Proc. of SIGGRAPH 2013 (ACM Transactions on Graphics, 32, 4), 2013, 12 pp. total.
Mujibiya, Adiyan et al., "The Sound of Touch: On-body Touch and Gesture Sensing Based on Transdermal Ultrasound Propagation", ITS '13 Proceedings of the 2013 ACM international conference on Interactive tabletops and surfaces, Oct. 6-9, 2013, pp. 189-198.
Paclet, Florent et al., "Motor control theories improve biomechanical model of the hand for finger pressing tasks", Journal of Biomechanics, vol. 45, 2012, pp. 1246-1251.
Pinton, Gianmarco F. et al., "A Heterogeneous Nonlinear Attenuating Full-Wave Model of Ultrasound", IEEE Transactions on Ultrasonics, Ferroelectrics, and Frequency Control, vol. 56, No. 3, Mar. 2009, pp. 474-488.
Richard, William D. et al., "A scalable architecture for real-time synthetic-focus imaging", Ultrasonic Imaging, vol. 25, 2003, pp. 151-161.
Rolland, Jannick P. et al., "Dynamic focusing in head-mounted displays", Part of the IS&T/SPIE Conference on the Engineering Reality of Virtual Reality, SPIE vol. 3639, Jan. 1999, pp. 463-470.
Shi, Jun et al., "Feasibility of controlling prosthetic hand using sonomyography signal in real time: Preliminary study", Journal of Rehabilitation Research & Development, vol. 47, No. 2, 2010, pp. 87-97.
Sikdar, Siddhartha et al., "Novel Method for Predicting Dexterous Individual Finger Movements by Imaging Muscle Activity Using a Wearable Ultrasonic System", IEEE Transactions on Neural Systems and Rehabilitation Engineering, vol. 22, No. 1, Jan. 2014, pp. 69-76.
Sueda, Shinjiro et al., "Musculotendon Simulation for Hand Animation", ACM Transactions on Graphics (TOG)—Proceedings of ACM SIGGRAPH 2008, vol. 27 Issue 3, Article No. 83, vol. 27 Issue 3, Aug. 2008, 8 pp. total.
Szabo, Thomas L., "Diagnostic Ultrasound Imaging: Inside Out, Second Edition", Elsevier Inc., 2013, 829 pp. total, 453 pages.
Van Den Branden Lambrecht, Christian J., "A Working Spatio-Temporal Model of the Human Visual System for Image Restoration and Quality Assessment Applications", ICASSP-96, Conference Proceedings of the 1996 IEEE International Conference on Acoustics, Speech, and Signal Processing, May 1996, 4 pp. total.
Watson, Andrew B. et al., "Model of human visual-motion sensing", Journal of the Optical Society of America A, vol. 2, No. 2, Feb. 1985, pp. 322-342.
Watson, Andrew B. et al., "Model of visual contrast gain control and pattern masking", Journal of the Optical Society of America A, vol. 14, No. 9, Sep. 1997, pp. 2379-2391.
Watson, Andrew B., "The search for optimal visual stimuli", Vision Research, vol. 38, 1998, pp. 1619-1621.
Watson, Andrew B., "The Spatial Standard Observer: A Human Visual Model for Display Inspection", Society for Information Display, SID 06 Digest, Jun. 2006, pp. 1312-1315.
Watson, Andrew B., "Visual detection of spatial contrast patterns: Evaluation of five simple models", Optics Express, vol. 6, No. 1, Jan. 3, 2000, pp. 12-33.
Wikipedia, "List of refractive indices", https://en.wikipedia.org/wiki/List_of_refractive_indices, Dec. 7, 2003, 5 pp. total.
Williams III, T. W., "Progress on stabilizing and controlling powered upper-limb prostheses", Journal of Rehabilitation Research & Development, Guest Editorial, vol. 48, No. 6, 2011, pp. ix-xix.
Willis, Karl D. et al., "MotionBeam: A Metaphor for Character Interaction with Handheld Projectors", CHI '11 Proceedings of the SIGCHI Conference on Human Factors in Computing Systems, May 7-12, 2011, pp. 1031-1040.
Yun, Xiaoping et al., "Design, Implementation, and Experimental Results of a Quaternion-Based Kalman Filter for Human Body Motion Tracking", IEEE Transactions on Robotics, vol. 22, No. 6, Dec. 2006, pp. 1216-1227.
Zhang, Cha et al., "Maximum Likelihood Sound Source Localization and Beamforming for Directional Microphone Arrays in Distributed Meetings", IEEE Transactions on Multimedia, vol. 10, No. 3, Apr. 2008, pp. 538-548.

\* cited by examiner

SYSTEMS AND METHODS FOR AUGMENTED NEAR-EYE WEARABLE DISPLAYS

CROSS REFERENCE TO RELATED APPLICATIONS

This application claims the benefit of U.S. Provisional Patent Application No. 62/269,510, filed Dec. 18, 2015, the entirety of which is incorporated herein by reference.

TECHNOLOGICAL FIELD

One aspect of the disclosure herein relates generally to wearable electronics and more particularly, to an augmented reality (AR) near-eye wearable display.

BACKGROUND

Wearable optical electronics are becoming commonplace as integrated circuit and display size and related costs scale downward. Wearable optical electronics have a wide number of commercial, military and consumer applications. Conventional near-eye wearable display solutions often use cumbersome, low-resolution approaches without consideration for user comfort or aesthetics.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments are now explained with reference to the appended drawings. Whenever aspects are not explicitly defined, the scope of the disclosure herein is not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

The inventors herein have recognized the need for a high resolution, augmented reality near-eye wearable display that has a small form factor and is well-suited for use in, for instance, aesthetically-pleasing consumer eyeglass frames. Embodiments described herein provide for such an augmented reality near-eye wearable display.

Embodiments herein may comprise one or a plurality of emissive display elements (referred to herein as imagers or light modulators) which may be embedded in the bridge or frame of a common eyeglass frame. The lens or lenses of the embodiments described herein may comprise transmissive diffractive optical elements (TDOEs) and partially reflective diffractive optical elements (RDOEs). The display outputs are directed toward the lens elements whereby the diffractive elements in turn direct the outputs toward the eye-boxes of the viewer.

In one embodiment, a near-eye wearable display is disclosed that may be configured as a common- (or typical) looking set of consumer eyewear glasses with the capability of providing an augmented reality (AR) display system; herein referred to as an AR wearable display. In one embodiment, the glasses have a curved viewing lens.

In one embodiment, the disclosed AR wearable display uses one or more emissive micro-pixel light modulators embedded within the frame chassis of a regular (or typical) looking set of eyewear glasses whereby the micro-pixel light modulator is an optoelectronic semiconductor device that comprises an array of independently addressable, full-color emissive micro-pixels and electronic circuitry configured to drive the emissive micro-pixel array; all fully integrated into a single semiconductor chip or package that is sufficiently volumetrically small to be embedded within the eyewear frame.

It is expressly noted that the embodiments herein are not limited to the use of the aforementioned light modulated emissive display element and that any manner of electronic display element such as an OLED or similar display element having suitable electrical and optical characteristics may be used and remain within the spirit and scope of any claims for the embodiments disclosed herein.

In one example embodiment, the emissive micro-pixel light modulator device embedded within the frame of the AR wearable display glasses may be based on the Quantum Photonic Imager or "QPI®" imager. QPI®" is a registered trademark of Ostendo Technologies, Inc. See U.S. Pat. No. 8,049,231, filed Mar. 19, 2010 by H. El-Ghoroury et al. is a micro-emissive solid state light emitting structure technology that has power and logic circuits integrated into the backplane of a high resolution GaN—GaAs layered pixel array and has micro-optics layers integrated on top of the pixel stack directly. This form of imager creates a power-efficient display that occupies a very small volume.

Example QPI imagers (micro-emissive solid state light-emitting display elements) suitable for use with the embodiments described herein include, without limitation, those disclosed in U.S. Pat. Nos. 7,623,560; 7,829,902; 8,567,960; 7,767,479; 8,049,231; and 8,243,770, each entitled "Quantum Photonic Imagers and Methods of Fabrication Thereof" and assigned to the Applicant herein, the entire contents of each of which are incorporated herein by reference.

The above-referenced QPI imagers feature high brightness, very fast light multi-color intensity and spatial modulation capabilities in a single emissive display device that includes all necessary display drive circuitry. Within the context of the embodiments described herein, the terms "imager" and "light modulator device" are intended to encompass an optoelectronics device that comprises an array of emissive micro-scale solid state light (SSL) emitting pixels. The SSL light emitting pixels of such a device may be either a light emitting diode (LED) or laser diode (LD) or any solid state light emitting structure whose on-off state is controlled by drive circuitry contained within a CMOS circuit upon which the emissive micro-scale pixel array is formed or bonded.

The pixels within the emissive micro-scale pixel array of a QPI imager are individually addressable spatially, chromatically and temporally through its drive CMOS circuitry enabling a QPI imager to emit light that is modulated spatially, chromatically and temporally. The multiple colors emitted by a QPI imager beneficially share the same pixel aperture. QPI imager pixels emit collimated (or non-Lamberitian) light with an angle of divergence ranging from ±5° to ±45°. The size of the pixels comprising the emissive array of a QPI imager are typically in the range of approximately 5-20 micron with the typical emissive surface area of the device being in the range of approximately 15-150 square millimeters. A QPI imager can be designed with a minimal gap between its emissive pixel array and the physical edge of the imager, allowing a multiplicity of QPI imagers to be tiled to create any arbitrary size display area.

Due to the smaller distances (throws) involved in the projection, a projected display using a QPI imager can be very bright without requiring significant power. The micro-optics and the focusing modules of a QPI imager of the above-listed U.S. patents are expressly designed in consideration of non-linear projection surfaces and throws. Of course, while QPI imagers are ideal for use as or in the imagers or light modulators, the embodiments herein are not so limited, and other imagers may be used as or in the imagers or light modulators of the present disclosure as desired.

Figure 1:
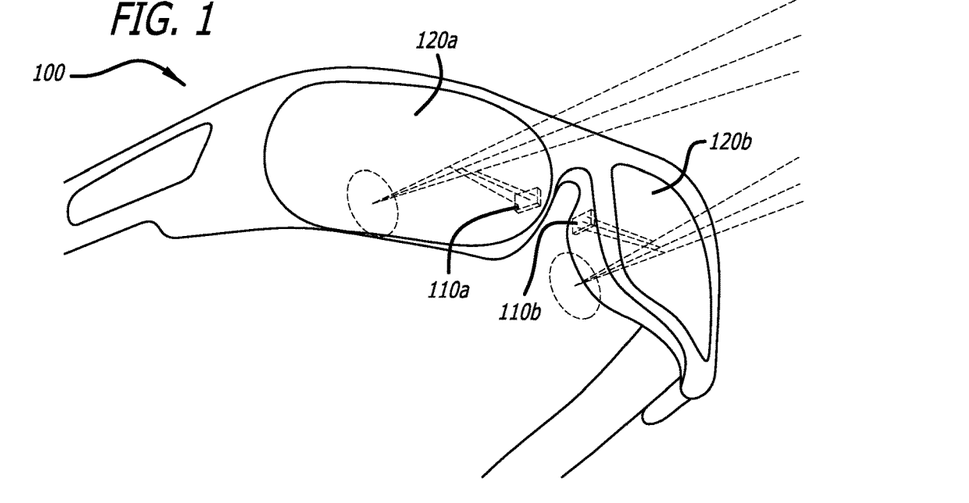
FIG. 1 is an isometric rear view for explaining two imagers or light modulators embedded at both sides of the near-eye display glasses bridge section and for explaining the ray traces of the light generated from the two imagers redirected by the glasses lens into the two eye-boxes according to an embodiment herein.

As illustrated in FIG. 1, at least two emissive micro-pixel light modulator devices 110a and 110b may be embedded within of the bridge section of an eyeglass frame 100, at least one device at each side, and each positioned such that its emissive aperture optical axis is directed toward the eyeglass lenses 120a and 120b in their respective side.

The emissive aperture of each of the light modulator devices may include an optical "cover" to aid in directing the optical axis of the micro-pixel light modulator toward the eyeglasses lenses in their respective side while maintaining the emissive micro-pixel light modulator devices fully embedded within volumetric envelope of the eyeglasses bridge section. In one embodiment, the optical cover associated with each of the light modulator devices is volumetrically compact to allow the light modulator device and its optical cover to be fully embedded within volumetric envelope of the eyeglasses bridge section. In one embodiment, in order to achieve the volumetric efficiency to enable the light modulator device to be fully embedded within volumetric envelope of the eyeglasses bridge section, the optical cover may be provided as a transmissive diffractive optical element ("TDOE" herein). By virtue of arrangements discussed herein combining light modulator devices with diffractive optical elements, it is possible to provide an augmented wearable display comprising eyeglasses having a curved lens. Thus, it is possible to provide a close face fitting eyeglass frame as an augmented near eye device. One example of eyeglass frames having a TDOE optical cover is illustrated in the example of FIGS. 2A and 2B.

Figures 2A, 2B:
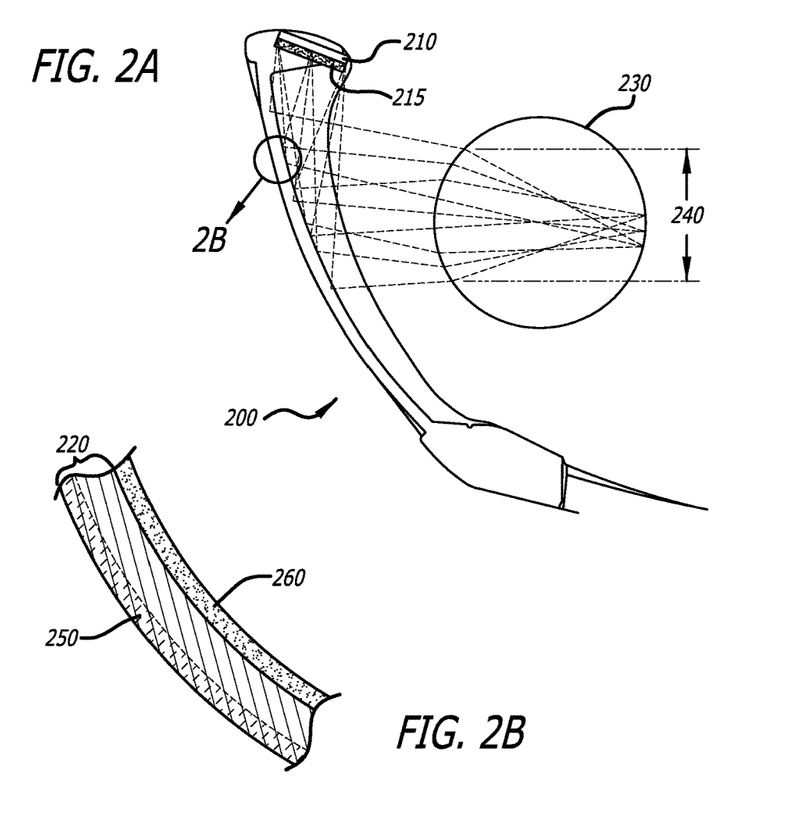
FIGS. 2A and 2B illustrate ray traces for explaining the light rays emitted from the imager at one side of the near-eye display being directed by a transmissive diffractive optical element (TDOE) toward the glasses lens and then reflected by a partially reflective diffractive optical element (RDOE) toward the eye pupil and focusing on the eye retina according to an embodiment herein.
Figure 6:
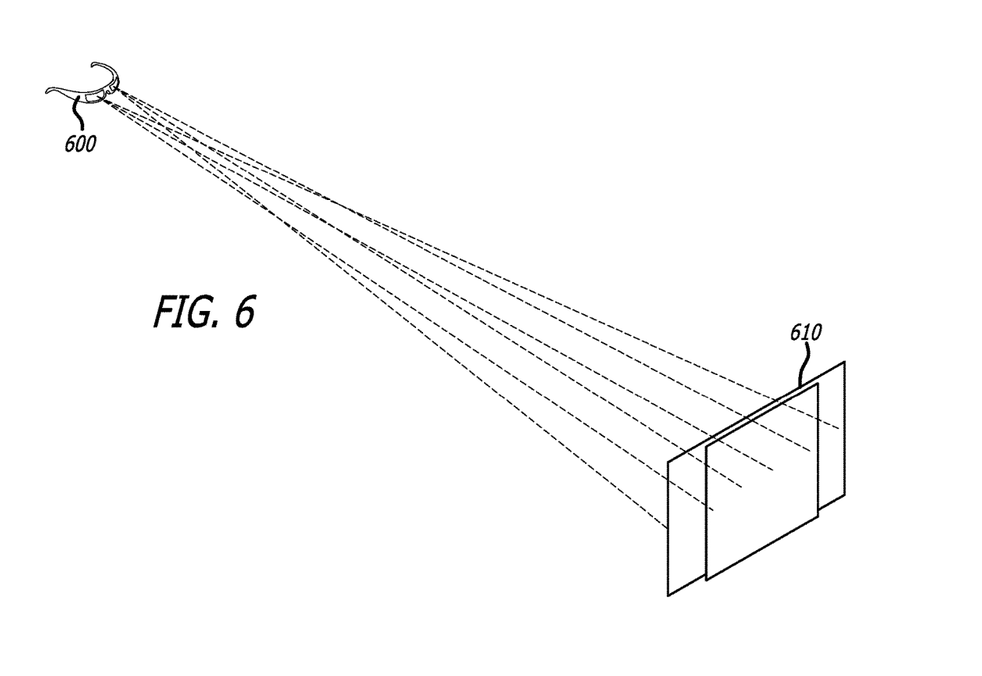
FIG. 6 is a view for explaining a ray trace illustrating the position of the formed virtual image perceived by an AR near-eye display viewer according to an embodiment herein.

Turning to the embodiment of FIGS. 2A and 2B, similar to eyeglass frames 100, eyeglass frames 200 include an optical lens 220 and a light modulator device 210. In the embodiment of FIGS. 2A and 2B, the emissive aperture of light modulator device 210 includes TDOE optical cover 215 to aid in directing the optical axis of the light modulator 210 toward the eyeglasses lenses 220. A TDOE element 260 is deposited on the surface of the lens 220 facing the eyeball 230. Light emitted from the light modulator 210 is directed by the optical cover 215 towards the TDOE element 260 and is then partially reflected by the reflective diffractive optical element (RDOE) 250 which is embedded in the surface of lens 220 facing the surrounding scene. The RDOE element 250 reflects the emitted light toward the pupil of eyeball 230 and focuses it on the eye retina. FIG. 6 shows a ray trace illustrating the position of a formed virtual image 610 perceived by the AR near-eye display viewer wearing eyeglass frame 600 according to an example embodiment. Eyeglass frame 600 may be, for example, eyeglass frames 100 shown in FIG. 1 or eyeglass frames 200 shown in FIGS. 2A and 2B.

As illustrated in the embodiment of FIGS. 2A and 2B, an TDOE optical cover such as optical cover 215 is associated with each of the light modulator devices 210 (e.g., 110a, 110b). TDOE optical cover 215 may be configured to map the chief light rays of each of the pixels of the light modulator device 210 in the respective arrays in the desired angular direction so that the chief rays of light emitted from the light modulator device pixels passes through the center of eyeball 230 after reflecting off the lens 220, hence achieving a pupil-matching function needed for comfortable viewing. The light emitted from each of the light modulator device pixels may thus be steered to the pupil. The light rays illustrated in FIGS. 2A and 2B may represent various colors in the visible light spectrum.

In addition, the described TDOE optical cover 215 associated with each of the light modulator devices (e.g., 210) desirably maps the chief rays of the light emitted from each of the light modulator device pixels in the desired direction such that the distortion of a virtual image projected onto the eyes' retinas is well-corrected in terms of optical distortion and aberration.

It is noted that in other embodiments TDOE optical cover 215 may be optional. For example in situations where the light cone from each light modulator device pixel is big and the level of brightness roll off is acceptable, TDOE optical cover 215 may be omitted.

The TDOE optical cover 215 associated with each of the light modulator devices 210 may be realized using either a surface relief or volume relief nano-imprint techniques. In one embodiment, the TDOE thin film may be realized using a photolithography process. In one embodiment, the TDOE optical cover may have a thickness in the range of 10-30 microns (e.g., 10, 13, 15, 20 or 30 microns). In one embodiment, the TDOE optical cover may be a Bragg grating (e.g., fiber Bragg grating). In one embodiment, the TDOE comprises a volume holographic grating. In one embodiment, the grating comprises straight lines. In one embodiment, the grating is not linear. In one embodiment, the face generated by the grating is not a planar surface. For example, the grating may be comprised of high order polynomial expressions. In one embodiment, the grating is not uniform and is graded. For example, the grating may be localized and/or freeform, the shape being dictated by the curvature of the eyeglass lens and the field of view of the near eye. In one embodiment, the top and the bottom of the grating are symmetrical. In one embodiment, the grating lines are not continuous over the viewing surface of the lens (e.g., not uniform). In one embodiment, the TDOE does not cover the entire surface of the eyeglass lens. In one embodiment, the grating lines may not traverse the entire optical image.

As illustrated in at least FIGS. 1, 2A, 2B and 9, the frame and lenses of the eyeglasses (e.g., 100, 200) may be conformal with the curvature of the human forehead with sufficient curvature to permit the intersection of the chief rays of the light that are emitted from the light modulator device pixels through the optical cover with the curved lenses of the eyeglasses at predetermined positions that are substantially on axis with the pupils of the human eyes. In the embodiment of FIGS. 2A and 2B, the light rays emitted from the pixels of the light modulator device 210 through the TDOE optical cover 215 are incident on the curved lenses of the eyeglass frames 200 and are reflected towards the viewing eye box of the near-eye display 200, which nominally incorporates the eye pupils of the near-eye display wearer.

Figure 7:
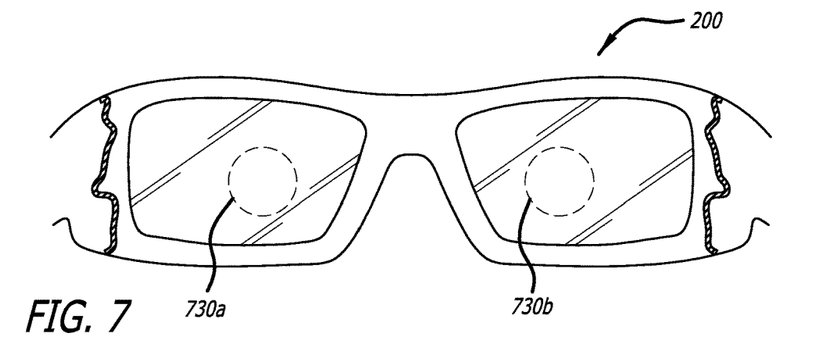
FIG. 7 is a front view for explaining the size and position of a pair of eye-boxes formed by the AR near-eye display according to an embodiment herein.

As further illustrated in the ray trace of FIGS. 2A and 2B, in one embodiment, the diameter 240 of the eye box of the near-eye display may be about 16 mm in diameter, which is sufficient to accommodate the nominal position of the display wearer's pupils plus a margin for the eye saccades (i.e., the eye pupil movements as it changes focus from one point to another). FIG. 7 is a front view of eyeglass frame 200 showing the approximate size and position of a pair of eye-boxes 730a, 730b formed by the AR near-eye display relative to eyeglass frame 200 according to one example embodiment.

Figure 3:
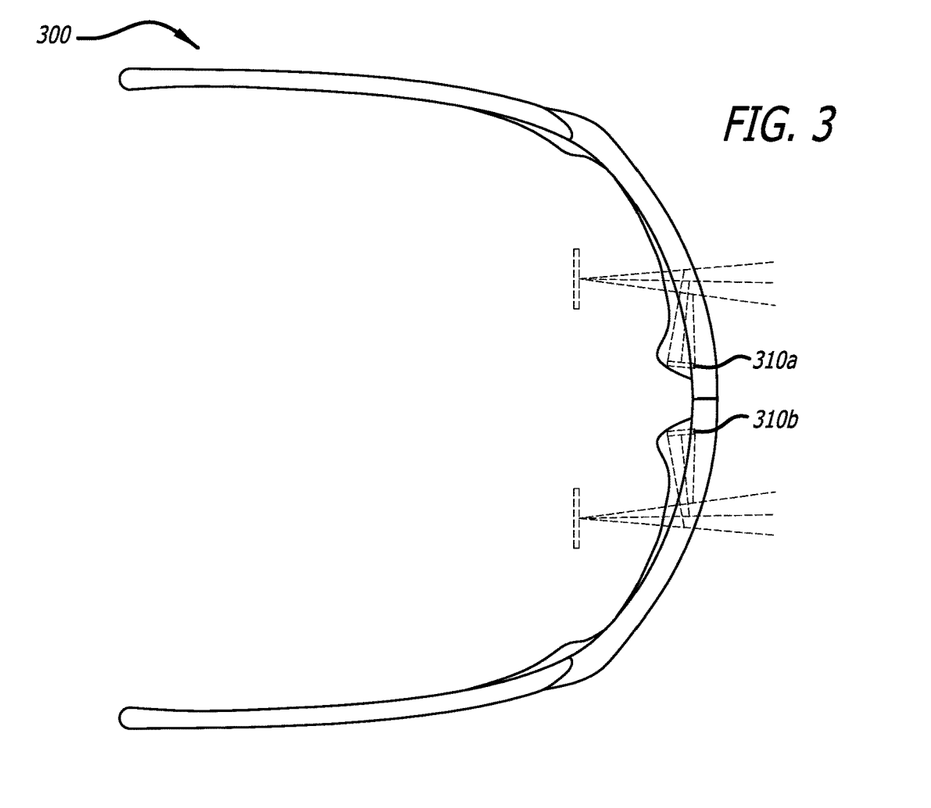
FIG. 3 is a top view of the AR near-eye display for explaining an embodiment in which two imagers are embedded within a bridge section of an eyeglass frame and ray traces of the light generated from two imagers are redirected by the glasses lens into two eye-boxes.
Figure 4:
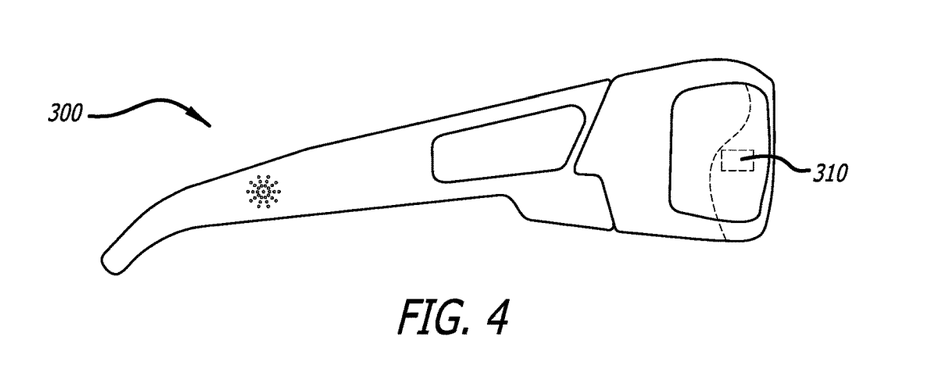
FIG. 4 is a side view of the AR near-eye display for explaining an embodiment in which two imager are embedded within a bridge section of an eyeglass frame.
Figure 5:
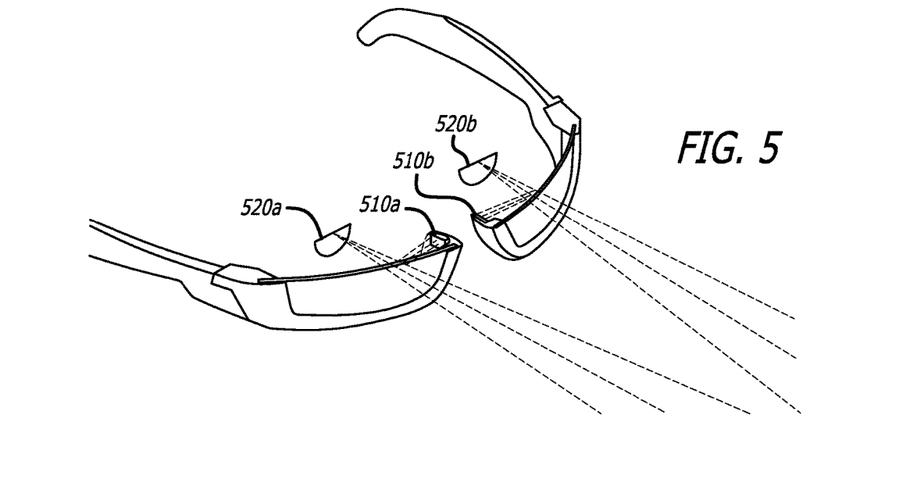
FIG. 5 is a solid isometric cross-sectional view of the AR near-eye display for explaining two imagers embedded within the bridge section of an eyeglass frame and the ray traces of the light generated from the two imagers being redirected by the glasses lens into two eye-boxes according to an embodiment herein.

FIG. 3 depicts a top view of an embodiment including two imagers in which each of the imagers 310a and 310b is embedded in a portion of the bridge of the eyeglass frame 300. Eyeglass frame 300 may be similar to eyeglass frame 100 or eyeglass frame 200. FIG. 4 depicts a side view of this embodiment in which each of the imagers 310 (individually 310a and 310b) is embedded in a portion of the bridge of the eyeglass frame 300. FIG. 5 shows a detailed view of two imagers 510a, 510b embedded in the bridge portion of an eyeglass frame, which may be similar to eyeglass frame 100, 200, or 300, and ray traces of light being directed into a viewer's eye-boxes 520a, 520b according to one embodiment.

Figure 8:
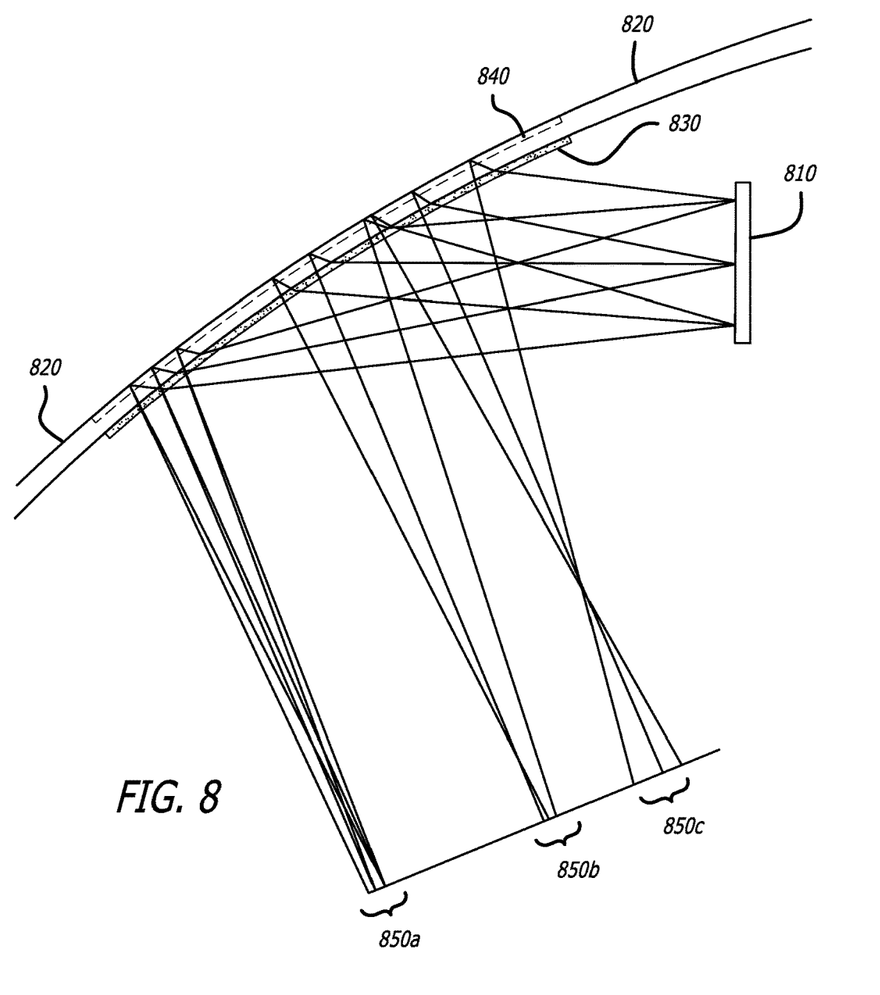
FIG. 8 is a view for explaining a ray trace of light rays emitted by an imager and being redirected toward the AR near display lens by the TDOE cover optics and then reflected by the RDOE layer embedded within the lens and toward the viewer's eye box according to an embodiment herein.
Figure 9:
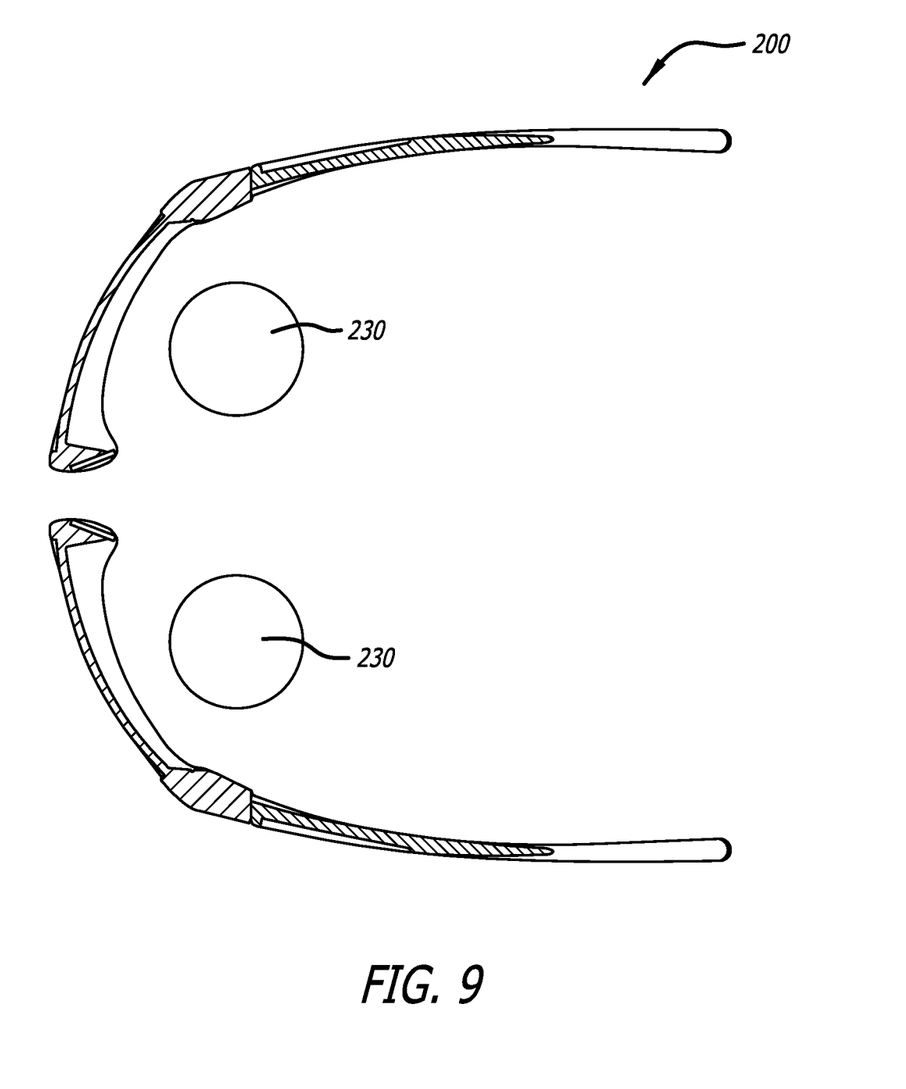
FIG. 9 is a schematic drawing for explaining an AR near-eye display according to one example embodiment herein.

FIG. 8 illustrates a ray trace of the light emitted by the imager 810 being redirected toward the AR near-eye display lens 820 having a TDOE layer 830 on the surface facing the eyeball of the viewer. The emitted light is then reflected by an RDOE layer 840 embedded within the lens 820 toward the viewer eye boxes. The bundles of light rays 850 (individually 850a, 850b, 850c) illustrated in FIG. 8 may represent various colors in the visible light spectrum.

In one embodiment, the lens 820, the light modulator device 810, the TDOE 830 and the RDOE 840 are configured so that each bundle of color rays (850a, 850b, 850c) meets at substantially the same point as shown in FIG. 8, such that it is possible for the eye to see an increased field of view. In the embodiment of FIG. 8, it is assumed that the emission angle of the pixels of the light modulator 810 is flat such that a TDOE optical cover (illustrated in FIGS. 2A and 2B) is not needed.

FIG. 8 illustrates an imaging path of the light emitted from the light modulator device 810 interacting with the eyeglass lens 820 and back to the eye. Not shown in FIG. 8 is light from the ambient surroundings being transmitted through the front of the eyeglass lens into the eye. To compensate for this, in one embodiment, in addition to TDOE optical cover 830 discussed above, the eyeglass frame has an another TDOE provided on the outer surface of the eyeglass lens 820 (e.g., the surface of the eyeglass lens facing the surrounding environment). This second TDOE may be an optical complement of the first TDOE 830. For example, the second TDOE may have a slope and direction opposite to those of the first TDOE 830. Accordingly, the second TDOE may undo the optical effect of the light transmitted through the lens.

Referring again to FIGS. 2A and 2B, in one embodiment, dimensions (e.g., angle, length) of the eyeball 230 relative to the eyeglass frame 200 may also be determined. Dimensions of an eye box are also determined, including a diameter 240. Using these dimensions together with information regarding the location of the light modulator device on the bridge of the eyeglass frame and a selected image magnification, a field of view is calculated. Assuming that the light rays emitted by the light modulator device should be directed into the eyeball and be collimated, direction of the light rays and the sunglass surface are considered. In one embodiment, the foregoing criteria are used to calculate parameters for designing the TDOE and RDOE. In one embodiment, an optimization algorithm is used to calculate the parameters. In one embodiment, a number of light rays are traced to cover or sample the features of the TDOE or RDOE over the viewing area of the eyeglass lens and the feature at each location is calculated.

In the described example embodiment having a 16 mm eye-box, the total field of view (FOV) of the near-eye display is approximately 10 degrees. However, when the eye-box size is reduced, for example to 8 mm, the near-eye display FOV increases to more than 15 degrees. It is noted that an 8 mm eye box is sufficiently large to accommodate a display wearer's eye pupils nominal position plus saccades.

The reflective aspects of the curved lenses of the near-eye display glasses may be realized by embedding within the curved lenses of the eyeglasses a partially reflective diffractive optical element (RDOE) thin film, illustrated in the example of FIG. 8 by RDOE 840 and in the example of FIGS. 2A and 2B by RDOE 250. The embedment of the DOE into the curved lenses of the eyeglasses may be realized by providing the DOE as a thin film that is coated on one side of the curved lenses of the eyeglasses and then further coated with a protective thin layer of a polymer. In one embodiment, the RDOE thin film is provided on the outer surface of the viewing lens of the eyeglasses (e.g., the surface of the lens facing the ambient surroundings or scene).

In one embodiment, the RDOE thin film embedded within the curved lenses of the near-eye display is sufficiently transmissive in order to enable the near-eye display wearer to see the ambient surroundings through the curved lenses of the near-eye display, thus making the near-eye display of this embodiment an optical "see-through" (OST) augmented reality (AR) system having AR capabilities. In one embodiment, the RDOE thin film is partially reflective. In one embodiment, the RDOE may have a reflectance characteristic of 30%. In one embodiment, the reflectance of the RDOE may be in a range from 20-60%. It is noted that if the reflectance characteristic of the RDOE is too high, viewing of the ambient surroundings by the near-eye display wearer may be limited. However, the RDOE must have a reflectance characteristic that is large enough to effectively reflect light emitted from the light modulator device. Therefore, in one embodiment, the RDOE implemented as a volume grating can be constructed such that it behaves as a high reflectance component in the light path from light modulator device while substantially transparent for the see-through light path. This arrangement ensures higher efficiency and little reduction of ambient scene brightness.

The RDOE thin film embedded within the curved lenses of the near-eye display may be realized using either a surface relief or volume relief nano-imprint techniques. In one embodiment, the RDOE thin film may be realized using a photolithography process. In one embodiment, the RDOE optical cover may have a thickness in the range of 10-30 microns (e.g., 10, 13, 15, 20 or 30 microns). In one embodiment, the RDOE optical cover may be a Bragg grating. In one embodiment, the RDOE comprises a volume holographic grating. In one embodiment, the grating comprises straight lines. In one embodiment, the grating is not linear. In one embodiment, the face generated by the grating is not a planar surface. For example, the grating may be comprised of high order polynomial expressions. In one embodiment, the grating is not uniform and is graded. For example, the grating may be localized and/or freeform, the shape being dictated by the curvature of the eyeglass lens and the field of view of the near eye. In one embodiment, the top and the bottom of the grating are symmetrical. In one embodiment, the grating lines are not continuous over the viewing surface of the lens (e.g., not uniform). In one embodiment, the RDOE does not cover the entire surface of the eyeglass lens. In one embodiment, the grating lines may not traverse the entire optical image.

In addition to directing the light emitted from the light modulator device towards the wearer's eyes, the RDOE thin film embedded within the curved lenses of the near-eye display may provide optical magnification and tilt aberration correction to ensure a well-corrected virtual image perceived by the near-eye display wearer.

In one embodiment, the nano-imprinted TDOE and RDOE layers of the near-eye display are designed to diffract broadband light. In one embodiment, the nano-imprinted TDOE and RDOE layers of the near-eye display are designed to diffract broadband light covering the visible light spectrum.

The diffraction angle achieved by the DOEs are typically wavelength-dependent and cause color separation of light transmitted through the TDOE optical cover associated with each of the light modulator devices and the light reflected by the RDOE embedded within the curved lenses of the near-eye display. This color separation may be alleviated by realizing the TDOE and RDOE each as multi-layers designed to diffract light with one sub-band of the visible spectrum.

A novel feature of the near-eye display of the embodiments herein uses the TDOE and RDOE to compensate for each other's color separation. In this color separation compensation approach, both the TDOE and RDOE are designed based on the wavelength of the middle of the visible light spectrum; approximately 550 nm wavelength; then the diffraction axis of the TDOE is aligned to be in the opposite direction of the RDOE, thus causing the wavelength of light below 550 nm to be diffracted in one direction by the TDOE then diffracted back by the RDOE toward the same angle of the 550 nm light. A similar effect occurs for light having a wavelength above 550 nm; it is first diffracted by TDOE on the opposite side of the 550 nm light, then diffracted back by the RDOE toward the same angle of the 550 nm light.

A further novel feature of the near-eye display of the embodiments herein takes advantage of digital warping and scaling of red and blue source images to make the corrections digitally using the light modulator device such that color separation is compensated.

The AR near-eye wearable display of the embodiments herein further comprises at least one image source (or imager) coupled to the input image aperture of each of the lenses of the AR near-eye wearable display whereby each imager is capable of generating a digital image comprising a multiplicity of multi-color pixels and having an optical output aperture that approximately matches the area and required angle of divergence of the input image aperture of the lenses of the AR near-eye wearable display.

The imager(s) are optically coupled to the lenses of the AR near-eye wearable display to be able to modulate either single view images or multi-view light field images. The imagers that are optically coupled the lenses of the AR wearable display are sufficiently compact to be coupled to the lenses without causing a large protrusion that would obstruct the AR wearable display viewer's field of view.

In one embodiment, the imagers that are optically coupled to the lenses of the AR wearable display achieve the prerequisite compactness by being of the emissive type and being capable of generating an image that approximately matches the area and required angle of divergence of the input image aperture of the lenses directly from their emissive surface without the need for an optical interface (or relay) comprising bulky optical elements that result in protrusions that obstruct the AR wearable display viewer's field of view.

The imagers that are optically coupled to the lenses of the AR wearable display may be configured to generate video images with a brightness that is digitally controllable within a range from about 1-15 lumens. In one embodiment, the imagers that are optically coupled to the lenses of the AR wearable display may be configured to generate video images with a brightness that is digitally controllable within a range from about 1-15 lumens at a minimal power consumption that enables practical integration within the compact configuration of the AR wearable display.

The imager's controllable brightness level may be used to enable generating the appropriate brightness level that matches the operational modes of the AR wearable display. The imagers that are optically coupled to the lenses of the AR wearable display are able to generate an image size and shape (in terms of the number and boundary of the pixels being modulated and coupled onto the lenses input aperture) that can be digitally controlled whereby the controllable image size and shape is used to couple an image with a variably-controlled size and shape onto the exit aperture of the lenses of the AR wearable display.

In one embodiment, uniformity of the brightness of the image may be controlled by excitation of the light modulator device.

Figure 10:
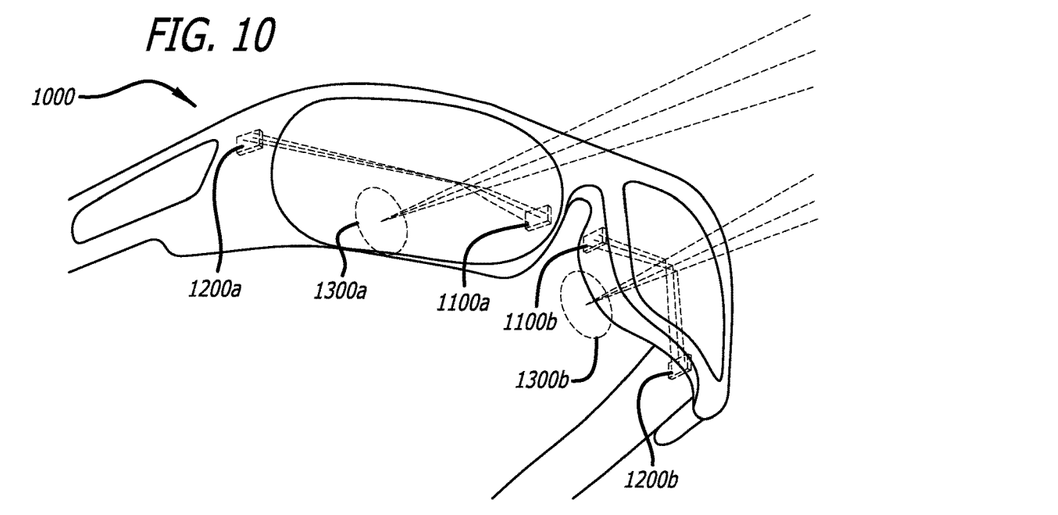
FIG. 10 is a transparent isometric rear view for explaining an embodiment in which two imagers are embedded at both sides of the bridge section of an eyeglass frame and two imagers are embedded in the arms assembly of the AR near-eye display and for explaining the ray traces of the light generated from the four imagers being redirected by the glasses lens into the two eye-boxes of the AR near-eye display according to an embodiment herein.
Figure 11:
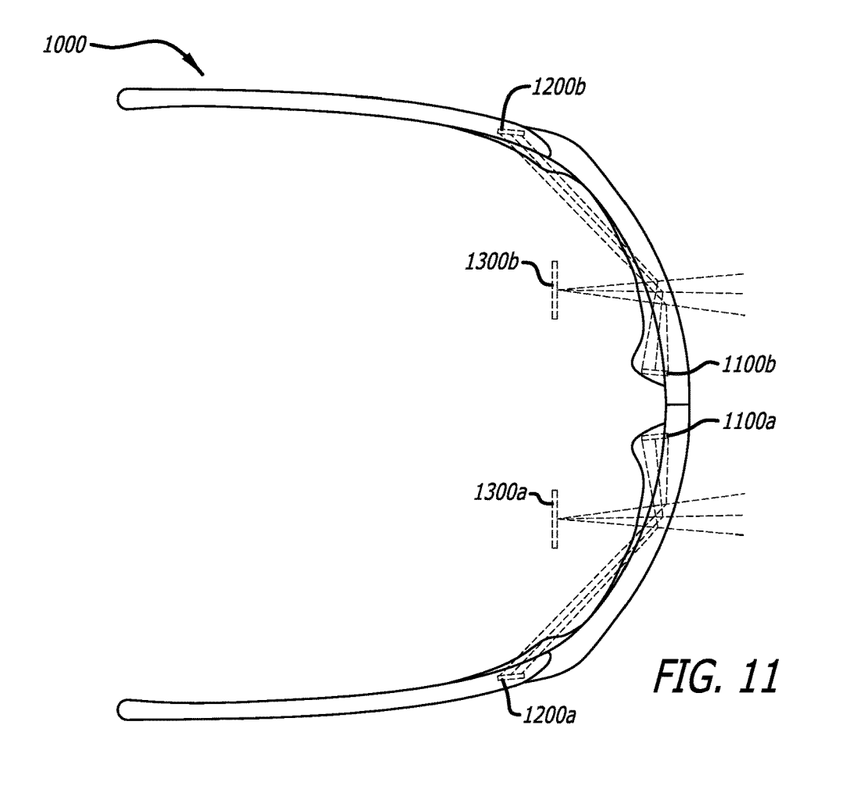
FIG. 11 is a top view line drawing for explaining an AR near-eye display according to one example embodiment showing two imagers embedded within the bridge section of an eyeglass frame and two imagers embedded in the arms assembly of the AR near-eye display and the ray traces of the light generated from the four imagers being redirected by the glasses lens into the two eye-boxes according to an embodiment herein.

Turning to FIGS. 10 and 11, these figures illustrate an embodiment in which two imagers 1100a, 1100b are embedded at both sides of the bridge section and two imagers 1200a, 1200b are embedded in the arms assembly of the AR near-eye display. FIGS. 10 and 11 also show the ray traces of the light generated from the four imagers being redirected by the glasses lens into the two eye-boxes 1300a, 1300b of the AR near-eye display 1000.

Thus, the imagers that are optically coupled to the lenses of the AR wearable display may be configured as at least one imager for each lens (as described earlier) or a plurality of imagers coupled onto multiple input image apertures of each lens whereby each imager is coupled to a different region of the lens aperture. In embodiments involving multiple imagers, multiple DOE features may be used, for example, one DOE may be used for each imager. These DOE features may be distributed as zones over the eyeglass lens, or they may be overlapped or mingled together spatially.

In one embodiment, the use of a plurality of imagers coupled onto multiple input image apertures of each lens of the AR near-eye wearable display with each coupled to a different region of the lens aperture and the optical path from the plurality of imagers through lens sub-region apertures causes light emitted from the different imagers to converge upon each of the viewer's eye pupils from different directions with the imagers associated with each sub-region, modulating a different perspective view, thus enabling the AR near-eye wearable display to display a multi-view light field.

The use of a plurality of multi-view light field imagers coupled onto multiple input image apertures of each lens of the AR near-eye wearable display enables the modulation of a light field that provides a sufficient number of views to each of the viewer's pupils (in one embodiment, 8-12 views per pupil with at least six views along the horizontal parallax) to the extent it substantially eliminates the so-called "vergence accommodation conflict" (VAC) effect (which causes severe viewer discomfort) and is typically encountered in prior art near-eye autostereoscopic displays, thus making the disclosed AR near-eye wearable display a VAC-free display.

The use of a plurality of imagers coupled onto multiple input image apertures of each lens of the AR near-eye wearable display further enables the increase of the display resolution (in terms of the number of pixels being displayed to the viewer) by either increasing the number of imagers optically coupled to each of the display lenses; for example using two imagers each having 500,000 10-micron pixels to enable one million pixels per eye, or by decreasing the imagers' pixel size; for example using one imager per eye of the same physical size as in the prior example but each having one million five-micron pixels to enable the same display resolution of one million pixels per eye.

The use of a plurality of imagers coupled onto multiple input image apertures of each lens of the AR near-eye wearable display enables the availability of high pixel resolution-per-eye modulating a sufficient number of views to each of the viewer's pupils, making it possible to modulate digital holographic images to the viewer.

The AR near-eye wearable display according to one embodiment may further comprise at least one eye-tracking sensor per eye to the output of the eye-tracking sensor being used to detect multiple parameters of the viewer's eyes including but not limited to the angular position (or look angle) of each eye, the iris diameter, and the distance between the two pupils.

The eye-tracking sensors of the AR near wearable display according to one embodiment may be a pair of miniature cameras each positioned to image one eye. In one embodiment, the eye-tracking sensors of the AR near wearable display may be placed in a non-obstructive position relative the eyes field of view (FOV) such as the bridge section of the glasses.

The eye-tracking sensors of the AR near-eye wearable display according to one embodiment may be configured to detect brightness and color uniformity across multiple display sub-regions of the AR near-eye wearable display whereby the images captured by the eye-tracking sensors are analyzed to determine the brightness and color of each of the display sub-regions, then the determined values are compared and the brightness and or color of the plurality of imagers coupled onto multiple input image apertures of each lens of the dual-mode AR near-eye wearable display which may be adjusted according to the color and brightness across the entire display aperture to be uniform within a predetermined threshold, for example 10%.

Many alterations and modifications may be made by those having ordinary skill in the art without departing from the spirit and scope of the embodiments discussed herein. Therefore, it must be understood that the illustrated embodiment has been set forth only for the purposes of example and that it should not be taken as limiting the described embodiments as defined by any claims in any subsequent application claiming priority to this application.

For example, notwithstanding the fact that the elements of such a claim may be set forth in a certain combination, it must be expressly understood that the disclosed embodiments may include other combinations of fewer, more or different elements, which are disclosed in above even when not initially claimed in such combinations.

The words used in this specification to describe the various embodiments are to be understood not only in the sense of their commonly defined meanings, but to include by special definition in this specification structure, material or acts beyond the scope of the commonly defined meanings.

Thus, if an element can be understood in the context of this specification as including more than one meaning, then its use in a subsequent claim must be understood as being generic to all possible meanings supported by the specification and by the word itself.

The definitions of the words or elements of any claims in any subsequent application claiming priority to this application should be, therefore, defined to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in such claims below or that a single element may be substituted for two or more elements in such a claim.

Although elements may be described above as acting in certain combinations and even subsequently claimed as such, it is to be expressly understood that one or more elements from a claimed combination can in some cases be excised from the combination and that such claimed combination may be directed to a subcombination or variation of a subcombination.

Insubstantial changes from any subsequently claimed subject matter as viewed by a person with ordinary skill in the art, now known or later devised, are expressly contemplated as being equivalently within the scope of such claims. Therefore, obvious substitutions now or later known to one with ordinary skill in the art are defined to be within the scope of the defined elements.

Any claims in any subsequent application claiming priority to this application are thus to be understood to include what is specifically illustrated and described above, what is conceptually equivalent, what can be obviously substituted and also what essentially incorporates the essential idea of the embodiments disclosed herein.

What is claimed is:

1. An augmented reality display system comprising:
   at least one optical lens element;
   the optical lens element comprising at least one transmissive diffractive optical element and at least one partially reflective diffractive optical element; and
   an emissive display device configured to output an optical image, wherein the emissive display device includes an optical cover comprising a second transmissive diffractive optical element being an optical complement of the at least one transmissive diffractive optical element,
   wherein the optical cover directs light toward the at least one transmissive diffractive optical element and the at least one partially reflective diffractive optical element partially reflects the light toward an eye box of a viewer as the optical image.

2. The system of claim 1 wherein the emissive display device is embedded in an eyeglass frame.

3. The system of claim 2 wherein the emissive display device is embedded in a bridge area of the eyeglass frame.

4. The system of claim 1 wherein the partially reflective diffractive optical element is embedded in a scene-facing surface of the optical lens element.

5. The system of claim 1 wherein the partially reflective diffractive optical element has a reflectance characteristic in the range of 20-60%.

6. The system of claim 1 wherein the transmissive diffractive optical element is deposited on a surface of the optical lens element facing the emissive display device.

7. The system of claim 1 wherein the transmissive diffractive optical element and the partially reflective diffractive optical element comprise a thin film.

8. The system of claim 1 wherein the transmissive diffractive optical element and the partially reflective diffractive optical element comprise a Bragg grating.

9. The system of claim 1 wherein the transmissive diffractive optical element and the partially reflective diffractive optical element comprise a volume holographic grating.

10. The system of claim 1 wherein the transmissive diffractive optical element and the partially reflective diffractive optical element comprise a graded grating that is not continuous over a viewing surface of the optical lens element.

11. The system of claim 1 further comprising a second transmissive diffractive optical element that is an optical complement of the transmissive diffractive optical element.

12. The system of claim 2 further comprising a second emissive display device embedded in an arm of the eyeglass frame.

13. The system of claim 1 further comprising at least one eye-tracking sensor to obtain at least one of an angular position of an eye, an iris diameter, and a distance between two pupils.

14. A method of providing an augmented reality display system, the method comprising:
   outputting, by an emissive display device, an optical image to an optical lens element, the optical lens element comprising at least one transmissive diffractive optical element and at least one partially reflective diffractive optical element;
   directing, by the transmissive diffractive optical element, the optical image to the partially reflective diffractive optical element;
   directing, by a second transmissive diffractive optical element, light from a surrounding environment to the partially reflective diffractive optical element, wherein the second transmissive diffractive optical element is an optical complement of the transmissive diffractive optical element; and
   reflecting, by the partially reflective diffractive optical element, the optical image to an eye box of a viewer.

15. The method of claim 14 wherein the transmissive diffractive optical element and the partially reflective diffractive optical element are defined in a surface relief nano-imprint process.

16. The method of claim 14 wherein the transmissive diffractive optical element and the partially reflective diffractive optical element are defined in a volume relief nano-imprint process.

17. The method of claim 14 wherein the partially reflective diffractive optical element has a reflectance characteristic in the range of 20-60%.

18. The method of claim 14 further comprising determining a dimension of the eye box and calculating a field of view based on the dimension of the eye box and a selected image magnification.

19. The method of claim 14 further comprising outputting, by a second emissive display device, a second optical image to the optical lens element.

20. The method of claim 14 further comprising tracking at least one of an angular position of an eye, an iris diameter, and a distance between two pupils.

* * * * *